United States Patent Office.

BENJAMIN BEST, OF DAYTON, OHIO.

Letters Patent No. 78,569, dated June 2, 1868.

IMPROVED COMPOSITION FOR DESTROYING INSECTS IN FRUIT-TREES.

*The Schedule referred to in these Letters Patent and making part of the same.*

TO ALL WHOM IT MAY CONCERN:

Be it known that I, BENJAMIN BEST, of Dayton, in the county of Montgomery, and State of Ohio, have invented an Improved Protector for Preserving Fruit and other Trees from Injury by Insects; and I do hereby declare that the following is a full, clear, and exact description of the same.

In order to preserve fruit and other trees and shrubs from the ravages of such insects as crawl up the trunk of the tree, to deposit their eggs in the fruit or branches, or to eat the foliage, or otherwise injure the tree, I surround it, at a short distance above the ground, with a band of cotton, wool, or straw, and saturate the same with a composition compounded from the following ingredients:

One gallon of sperm or whale-oil.
One half of a gallon of pine-tar.
One pound of carbonate of ammonia.
One pound of potash.
One half of a gallon of coal-tar.

These ingredients being thoroughly mixed, should be applied with a brush to said band every morning, for ten successive days, during the period when the insects are most abundant.

What I claim as my invention, and desire to secure by Letters Patent, is—

The mode of protecting trees, by the application of the hereinbefore-described composition to bands of fibrous material surrounding the trees, substantially as described.

In testimony whereof, I have signed my name to this specification in the presence of two subscribing witnesses.

BENJAMIN BEST.

Witnesses:
    DENNIS REGAN,
    JAMES TURNER.